United States Patent
Ahuja et al.

(10) Patent No.: US 7,317,918 B2
(45) Date of Patent: Jan. 8, 2008

(54) METHOD FOR DOMAIN NAME SERVICE (DNS) IN A WIRELESS AD HOC NETWORK

(75) Inventors: Ramandeep Ahuja, Chicago, IL (US); Surender Kumar, Naperville, IL (US); Vidya Narayanan, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 539 days.

(21) Appl. No.: 10/894,086

(22) Filed: Jul. 19, 2004

(65) Prior Publication Data

US 2006/0013158 A1 Jan. 19, 2006

(51) Int. Cl.
*H04Q 7/20* (2006.01)

(52) U.S. Cl. ............ 455/445; 455/517; 455/520; 455/13.1; 455/11.1; 455/16; 370/328; 370/329; 370/338

(58) Field of Classification Search ........ 455/445, 455/517, 520, 13.1, 11.1, 16; 370/328–338, 370/431
See application file for complete search history.

(56) References Cited

U.S. PATENT DOCUMENTS

| | | | | |
|---|---|---|---|---|
| 6,980,537 | B1 * | 12/2005 | Liu | 370/338 |
| 7,016,306 | B2 * | 3/2006 | Alapuranen et al. | 370/238 |
| 2003/0126199 | A1 * | 7/2003 | Kadri et al. | 709/203 |
| 2004/0208119 | A1 * | 10/2004 | Christodoulou et al. | 370/228 |
| 2005/0086377 | A1 * | 4/2005 | Aso | 709/245 |
| 2005/0267991 | A1 * | 12/2005 | Huitema et al. | 709/245 |
| 2005/0267992 | A1 * | 12/2005 | Huitema et al. | 709/245 |
| 2006/0135205 | A1 * | 6/2006 | Metke et al. | 455/557 |

* cited by examiner

*Primary Examiner*—Rafael Perez-Gutierrez
*Assistant Examiner*—Khai Nguyen
(74) *Attorney, Agent, or Firm*—Valerie M. Davis

(57) ABSTRACT

In a wireless ad hoc network comprising a plurality of nodes, a primary node receives a domain name service (DNS) query from a node. The primary node determines whether the query can be resolved based on cached information. If the DNS query can be resolved based on cached information, the primary node sends a response to the node. If the DNS query cannot be resolved based on cached information, the primary node sends the DNS query outside the ad hoc network for resolution.

15 Claims, 10 Drawing Sheets

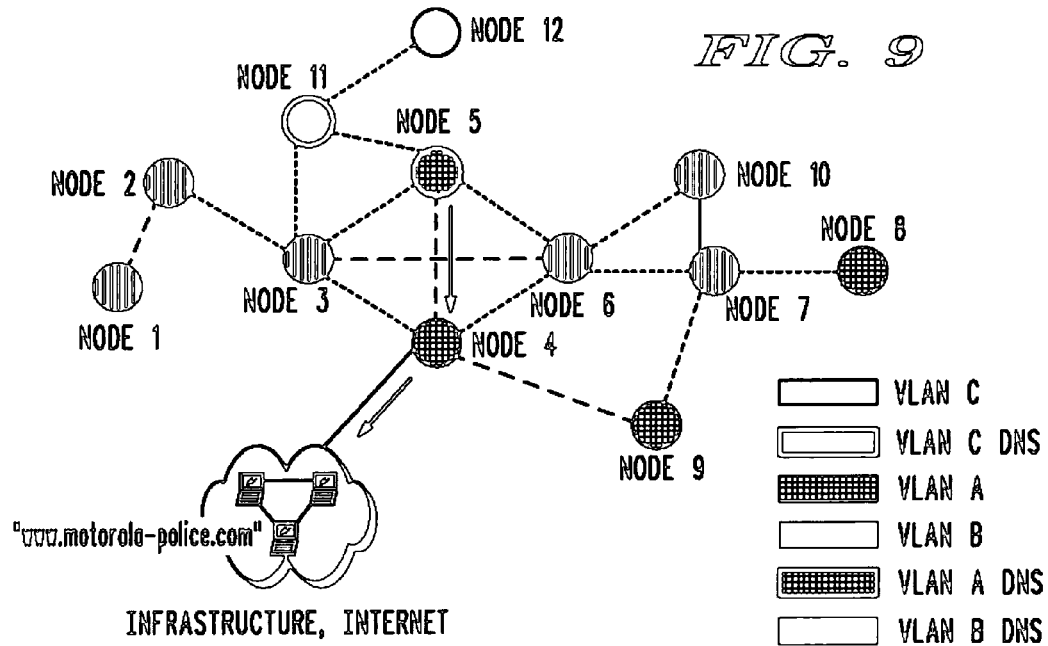
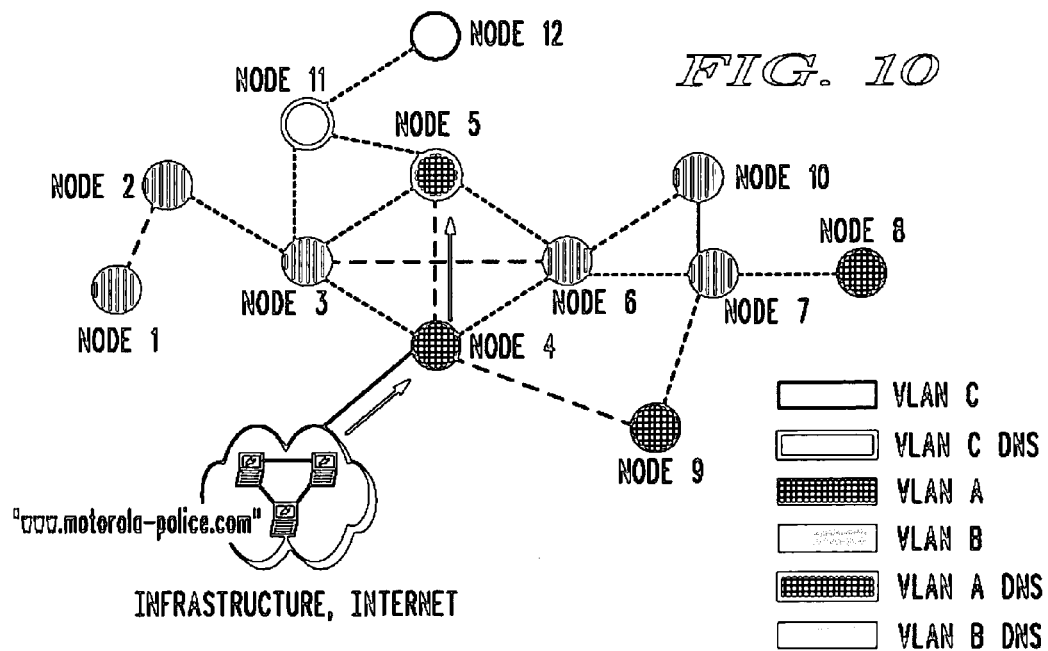

METHOD FOR DOMAIN NAME SERVICE (DNS) IN A WIRELESS AD HOC NETWORK

REFERENCE to RELATED APPLICATION

The present application is related to the following U.S. application commonly owned together with this application by Motorola, Inc.: Ser. No. 10/892,758, filed Jul. 16, 2004 titled "METHOD OF DYNAMIC MANAGEMENT OF A VIRTUAL LOCAL AREA NETWORK (VLAN) N A WIRELESS AD Hoc NETWORK" by Ahuja et al.

FIELD OF THE INVENTION

The present invention relates generally to a method for domain name service in a wireless ad hoc network.

BACKGROUND OF THE INVENTION

A wireless ad hoc network is a collection of nodes that communicate by forming a multi-hop radio network without the need of an infrastructure. Nodes in an ad hoc network forward information (e.g., frames) to other nodes by selecting one of the available routes to the destination node based on several parameters, such as link quality, round trip time, etc. Generally ad hoc nodes do not have a fixed topology, but ad hoc networks can be fixed and perform multi-hopping. Nodes can join the ad hoc network and leave dynamically, and the ad hoc networks can vary in the degree of mobility. The ad hoc network heals itself by selecting alternate routes to the destination node, and each node in an ad hoc network can be viewed as a router. The dynamic formation of ad hoc networks, the ability to setup a network anywhere without the need of infrastructure, and the self healing characteristic makes the ad hoc network very necessary for situations, such as public safety incident scenes, where infrastructure connectivity (e.g., access points) might not be available.

An ad hoc network does not always have access to the infrastructure and therefore cannot resolve domain names, such as "www.motorola-ems com", into IP addresses. Today, a domain name service (DNS) is implemented in a hierarchical fashion with every node setup with two static DNS entries for operating in an infrastructure-based network; this mechanism fails to work in an ad hoc network where nodes can dynamically join and leave the network. Two nodes in an ad hoc network could statically be assigned to act as primary and secondary DNS nodes to provide name resolution; however, both nodes may become unavailable at any time due to the dynamic nature of the ad hoc network.

Thus, there exists a need to provide a method for DNS in an ad hoc network.

BRIEF DESCRIPTION OF THE FIGURES

A preferred embodiment of the invention is now described, by way of example only, with reference to the accompanying figures in which:

FIG. 9 further illustrates the third example of FIGS. 7-8 in accordance with the present invention;

FIG. 10 further illustrates the third example of FIGS. 7-9 in accordance with the present invention;

DETAILED DESCRIPTION OF THE PREFERRED EMBODIMENT

Figure 1:
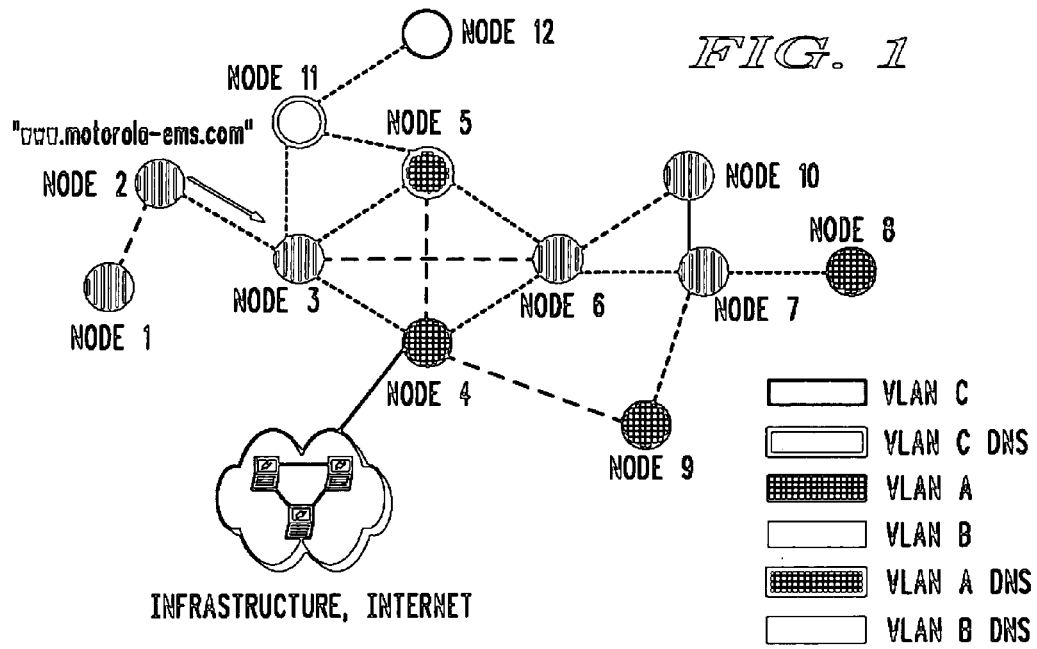
FIG. 1 illustrates a first example where a query is resolved within the VLAN of the requesting node in accordance with a first embodiment of the present invention.

The present invention provides dynamic selection of active domain name service (DNS) providers to provide domain name to IP address mapping (i.e., domain name resolution) in a wireless ad hoc network. Due to the dynamic nature of ad hoc network, the present invention does not rely on the same primary and/or secondary DNS nodes always being present in the ad hoc network. As such, the present invention adapts to nodes joining and/or leaving the wireless ad hoc network while still providing domain name to IP address mapping resolution throughout the wireless ad hoc network. Let us now refer to the figures to describe the present invention in greater detail. It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

In a first embodiment of the present invention, the DNS is provided by a single primary DNS node in the wireless ad hoc network. The primary DNS node in the wireless ad hoc network is dynamically elected by one of a variety of methods known to individuals skilled in the art, such as using any known election algorithm. One or more secondary DNS nodes are also elected to provide DNS service to the ad hoc network if the primary DNS node becomes unavailable (e.g., the primary DNS node leaves the ad hoc network, the primary DNS node becomes non-responsive for a predetermined amount of time, or the like). The secondary DNS nodes keep shadows of (i.e., mirrors) the DNS database maintained by the primary DNS node. The primary DNS node may elect the one or more secondary DNS nodes, or the secondary DNS node(s) can be elected in a similar fashion as the primary node, for example, using a known election algorithm. When the primary DNS node is no longer available (e.g., the node leaves the ad hoc network), the secondary DNS node assumes the role of the primary DNS node, and a new secondary DNS node is elected at that time to serve as the backup. It should be noted that the present invention assumes that there are some "keep-alive" mechanisms between the primary and secondary DNS nodes to detect the loss of the primary DNS node as commonly known to those individuals of ordinary skill in the art, for example, the secondary DNS node detecting that the primary DNS node has become non-responsive.

In operation, a requesting node in the ad hoc network sends a DNS query to the primary DNS node for domain name resolution (i.e., to provide the IP address corresponding to the domain name). If the primary DNS node is able to determine the IP address of the query, the primary DNS node responds back to the requesting node with the domain name to IP address mapping, and the requesting node, and any other nodes used to route the response to the requesting node, preferably caches the response. If the primary DNS node, however, cannot provide the IP address for the domain name, the primary DNS node queries the infrastructure outside of the ad hoc network for domain name resolution. Preferably, the primary DNS node has infrastructure connectivity and is able to query the infrastructure directly; otherwise, the primary DNS node queries the infrastructure indirectly via another node in the ad hoc network having infrastructure connectivity, if such a node exists. Once the infrastructure provides the response to the DNS query, the primary DNS node caches the domain name to IP address mapping resolution and sends the response to the requesting node. Preferably, in addition to the primary DNS node caching the response received from the infrastructure, any other node used to route the response to, and including, the requesting node also caches the domain name to IP address mapping resolution. It should be noted that the amount of time that any node retains the mapping is configurable.

Let us now expand the first embodiment of the present invention and assume that the ad hoc network comprises a plurality of virtual local area networks (VLANs) as described in co-pending patent application titled "Method of Dynamic Management of a Virtual Local Area Network (VLAN) in a Wireless Ad Hoc Network" and incorporated herein by reference. As described in the co-pending application, each node in the ad hoc network belongs to at least one VLAN. In accordance with the present invention, each VLAN present in the ad hoc network has a primary DNS node and at least one secondary DNS node; thus, there are a plurality of primary and secondary DNS nodes throughout the ad hoc network. Each primary DNS node assumes a unique well-known IP address; preferably this unique well-known address is reserved, however, it does not have to be. For example, the primary DNS nodes within VLAN A, VLAN B and VLAN C assume IP addresses a1.a2.a3.50, b1.b2.b3.50, and c1.c2.c3.50, respectively. Optionally, the primary DNS nodes may also join a multicast group over which they can communicate with each other; for example, the primary DNS nodes may use the multicast group to periodically send messages to each other to advertise which VLANs has a node with infrastructure connectivity.

Thus, in operation, a member node of a first VLAN sends a DNS query to the primary DNS node within the first VLAN for domain name resolution. If the primary DNS node within the first VLAN is able to determine the IP address of the query, the primary DNS node within the first VLAN responds to the requesting member node with the IP address for the domain name. If the primary DNS node within the first VLAN, however, cannot determine the IP address for the domain name, the primary DNS node within the first VLAN sends the query to at least a subset of, if not all, the primary DNS nodes within other VLANs in the ad hoc network. If a second primary DNS node within a second VLAN is able to determine the IP address of the queried domain name, the second primary DNS node responds to the first primary DNS node with the domain name to IP address mapping. In response, the first primary DNS node updates its cache with the domain name to IP address mapping and forwards the mapping to the requesting node. It should be noted that in addition to the first primary DNS node caching the mapping response, it is preferable that the requesting member node, and any node used to route the response to the requesting node, also cache the mapping response.

If the first primary DNS node, however, does not receive any response from the other primary DNS nodes in the ad hoc network after a configurable amount of time lapses, the first primary DNS node sends the DNS query to the infrastructure outside the ad hoc network for resolution. If the first primary DNS node determines that there is infrastructure connectivity within its VLAN, the first primary DNS node sends the query to the infrastructure directly or via a member node within its own VLAN (the first VLAN). If the first primary DNS node determines that there is no infrastructure connectivity within its VLAN, either directly or indirectly, the first primary DNS node determines which VLANs in the ad hoc network has infrastructure connectivity and sends a directed query requesting infrastructure resolution to the most appropriate primary DNS node. The first primary DNS node is aware of which VLANs have member nodes with connectivity outside the ad hoc network based on the periodic advertising messages sent among all the primary DNS nodes in the network; the most appropriate primary DNS node to send the directed query to is typically based on criteria such as, but not limited to, radio frequency capabilities, signal to noise ratio, shortest route, delay/congestion time, etc. The primary DNS node that receives the directed query for infrastructure resolution sends the DNS query to the infrastructure outside the ad hoc network, either directly or indirectly, receives the IP address for the queried domain name, updates its cache with the response (the domain name-to-IP address mapping), and forwards the response to the first primary DNS node. In turn, the first primary DNS node updates its cache with the response and forwards the response to the requesting node. Preferably, each node used to route the response from the infrastructure to, and including, the requesting node, also caches the response.

Alternatively, instead of the second primary DNS node waiting to receive a directed query from the first primary DNS node requesting infrastructure resolution, when the second primary DNS node receives the DNS query from the first primary DNS node and determines that it cannot resolve the query based on its cached information, the second primary DNS node automatically sends the query to the infrastructure without the need to receive the directed query from the first primary DNS node. The response is processed in the same manner as described above.

Let us now refer to a second embodiment of the present invention. In the second embodiment, every node in the ad hoc network is provided with the capability of assuming the role of a DNS node. As in the first embodiment described above, a primary DNS node is elected by using any known techniques known in the art, such as an election algorithm. In the second embodiment, however, the primary DNS node periodically sends out a broadcast message to all the nodes in the ad hoc network. The first broadcast contains the DNS database in its entirety, which is cached by all the nodes in the ad hoc network. Subsequent broadcasts by the primary DNS node are either null or deltas of the DNS database, depending on whether there are changes to the ad hoc network. As a result, the nodes in the ad hoc network almost never send queries to the primary DNS node for domain name resolution since each node in the ad hoc network shadows the DNS database maintained by the primary DNS node via the broadcasts. Nodes in the ad hoc network, however, send queries to the primary DNS node if the resolution is not cached in its database. In these cases, the primary DNS node determines whether it can resolve the query based on its cached information. If the primary DNS node can resolve the query from its cached information, the primary DNS node sends a broadcast to all the nodes with the updated information, including the response to the query (or alternatively, sends a response to the query directly to the requesting node and sends a broadcast to all the nodes at a later time), and in turn, the node(s) updates its cache with the response. If the primary DNS node cannot resolve the query from its cached information, the primary DNS node sends the DNS query outside of the ad hoc network for resolution; if the DNS query is resolved outside the ad hoc network, the primary DNS node, and preferably each node used to route the response to, and including, the requesting node, also caches the domain name to IP address mapping.

It should be noted that in the preferred embodiment, the primary DNS node is notified whenever a new node joins the network; upon this notification, the primary DNS node automatically sends the new node the DNS database in its entirety, and the new node receives the periodic updates of the DNS database via the broadcast messages; alternatively, the new node, upon joining the ad hoc network, requests the current DNS database either from the primary DNS node or a neighboring node. It is also important to note that the loss of the primary DNS node (e.g., the primary DNS node leaves the ad hoc network) is detectable by the nodes in the ad hoc network when a configurable number of broadcasts are missed; at that time, another primary DNS node is elected.

Now let us expand the second embodiment as we did the first embodiment and add a plurality of VLANs to the ad hoc network. In the expanded second embodiment of the present invention, each VLAN in the ad hoc network has a primary DNS node and at least one secondary DNS node. In the expanded second embodiment, however, each primary DNS node periodically sends out a broadcast as described above to all the nodes in its given VLAN. As such, subsequent broadcasts are either null or deltas of the DNS database, depending on whether there are changes to the given VLAN or updates to the DNS database. As a result, the member nodes within a VLAN almost never send queries for name resolution within the same VLAN since each node in the VLAN maintains its own DNS database. If a member node cannot resolve its query, the member node sends the query to its primary DNS node. Upon receipt of the query, the primary DNS node determines whether there was an update to the DNS database that it has not yet broadcasted to the nodes in the VLAN that solves the query. If there was an update to the DNS database that solves the query, the first primary DNS node sends a broadcast to all the nodes within the VLAN with the updated information, including the response to the query (or alternatively, sends a response directly to the requesting member node and sends a broadcast to all the nodes in the VLAN at a later time), and in turn, the nodes update their cache accordingly. If the first primary DNS node, however, is unable to resolve the query, it sends the query to at least a subset of the other primary DNS nodes in the network and proceeds accordingly as described above in the first embodiment.

Let us now refer to some examples of the first embodiment of the present invention. In all of the examples, nodes 4, 5, 8, and 9 belong to VLAN A, nodes 1, 2, 3, 6, 7 and 10 belong to VLAN B, and nodes 11 and 12 belong to VLAN C. Further, node 5 is elected as the primary DNS node within VLAN A, node 3 is elected as the primary DNS node within VLAN B, and node 11 is elected as the primary DNS node within VLAN C; as noted above, each VLAN also has at least one elected secondary DNS node, however, the secondary DNS nodes are not identified in the figures for simplicity. The examples also assume, as noted above, that the primary DNS nodes communicate with each other over the default VLAN. Also, in these examples, each primary DNS node periodically sends updates to the other primary DNS node regarding whether a node in their VLAN, including itself, has connectivity to the infrastructure as described above. Let us now describe the examples.

EXAMPLE 1

Figure 2:
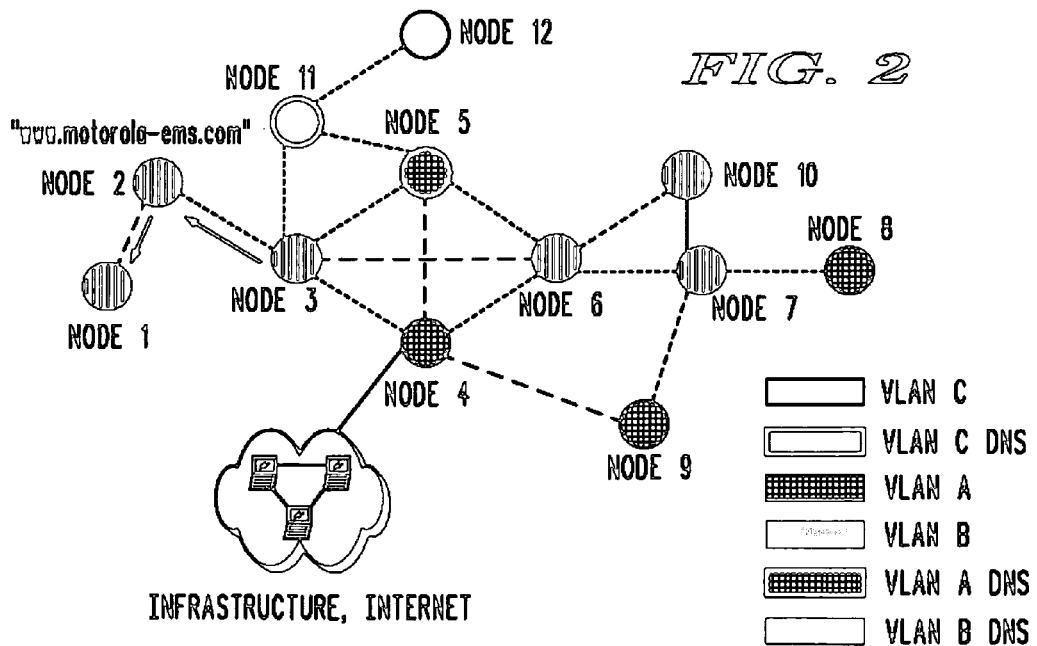
FIG. 2 further illustrates the first example of FIG. 1 in accordance with the present invention.

FIGS. 1-2 illustrate a first example where the DNS query is resolved within the VLAN of the requesting node. In this example, as illustrated in FIG. 1, node 1 (the requesting node belonging to VLAN B) initiates a DNS query directed towards node 3 (the primary DNS node within VLAN B) to provide an IP address for node 2 having a domain name of "www.motorola-ems.com". Upon receipt of the DNS query, node 3 determines whether it can resolve the query based on the information stored in its internal cache. In this example, node 3 has the domain name to IP address mapping for node 2 stored in its cache and forwards the mapping to node 1 (the requesting node) as illustrated in FIG. 2. It should be noted that it is preferable that nodes 1 and 2 cache the response to the DNS query.

EXAMPLE 2

Figure 3:
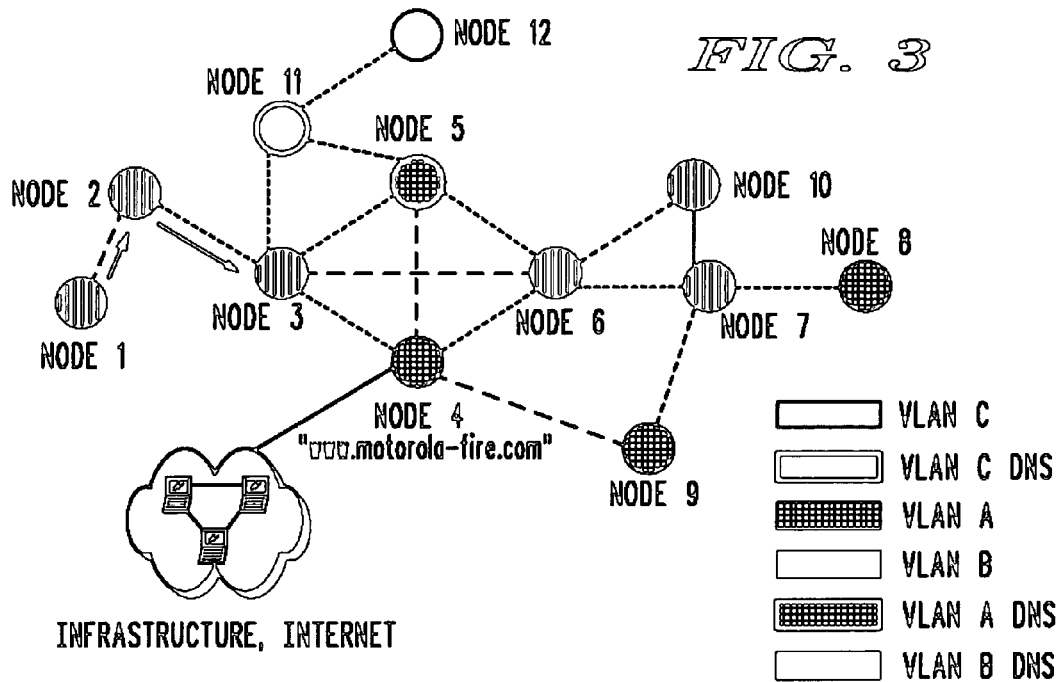
FIG. 3 illustrates a second example where the query is sent to another VLAN for domain name resolution in accordance with the first embodiment of the present invention.
Figure 4:
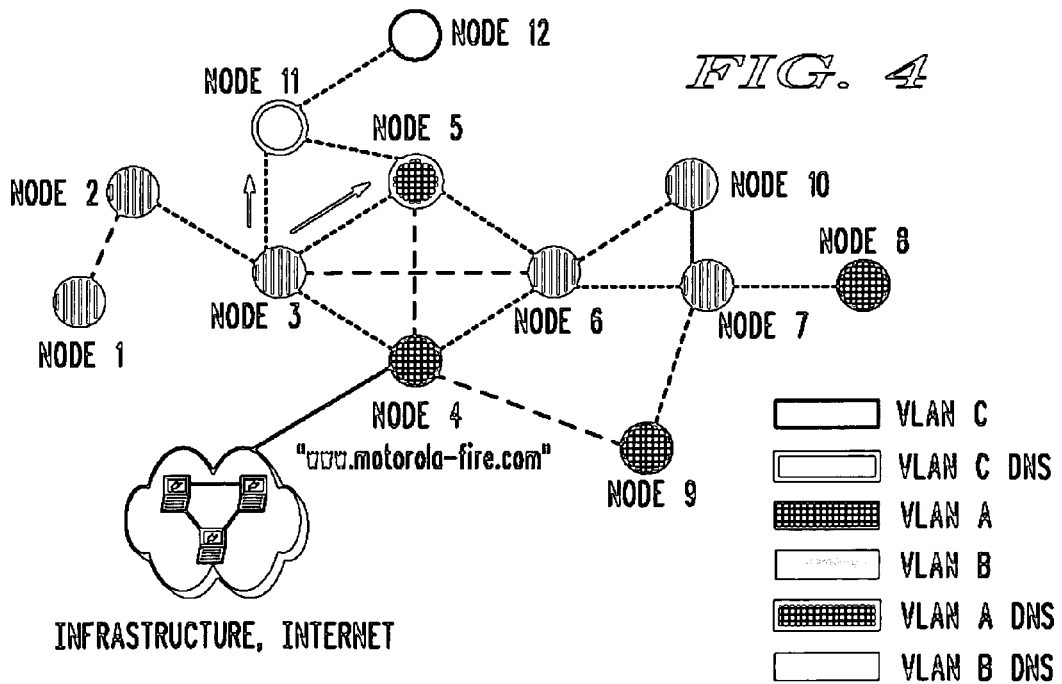
FIG. 4 further illustrates the second example of FIG. 3 in accordance with the present invention.

In the next example as illustrated in FIGS. 3-6, the DNS query is sent to another VLAN for domain name resolution. In this example, node 1 (the requesting node belonging to VLAN B) initiates a DNS query directed towards node 3 (the primary DNS node within VLAN B) to resolve the domain name "www.motorola-fire.com" for node 4 as illustrated in FIG. 3. Upon receipt of the DNS query, node 3 determines whether it can resolve the query based on the information stored in its internal cache. In this example, since node 3 is unable to resolve the query, it forwards the query to the other primary DNS nodes in the ad hoc network: node 5 (the primary DNS node within VLAN A) and node 11 (the primary DNS node within VLAN C) as illustrated in FIG. 4.

Figure 5:
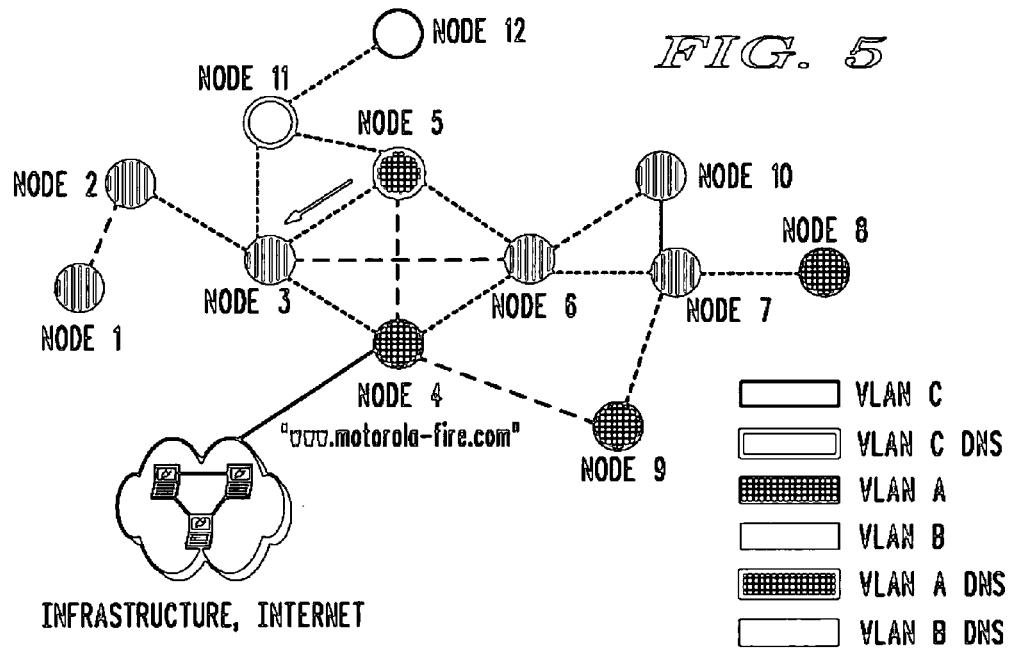
FIG. 5 further illustrates the second example of FIGS. 3-4 in accordance with the present invention.
Figure 6:
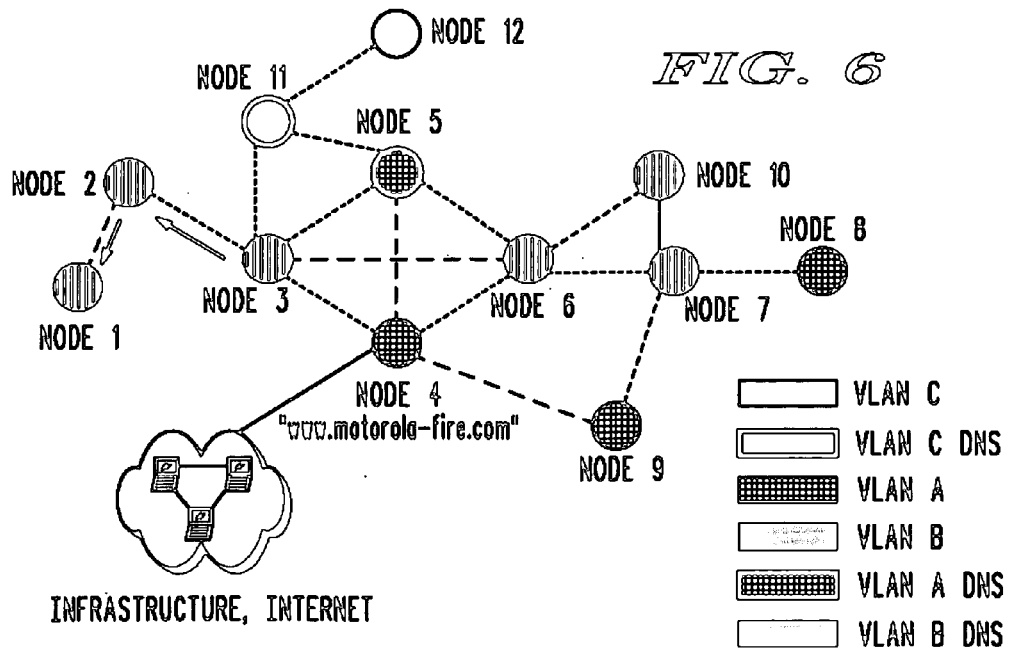
FIG. 6 further illustrates the second example of FIGS. 3-5 in accordance with the present invention.

Upon receipt of the DNS query, node 5 determines that it is capable of resolving the query from its internal cache and sends a response to the query back to node 3 as illustrated in FIG. 5. When node 3 receives the response (the domain name to IP address mapping) from node 5, node 3 updates its cache with the mapping and forwards the response to the requesting node 1 as illustrated in FIG. 6. If node 11 also had the resolution to the query, it sends the response to node 3 as well; otherwise, node 11 does nothing. Since node 3 previously received the resolution to the DNS query from node 5, node 3 disregards the response from node 11, if any, but may record the response time in order to estimate delay/congestion time, round-trip time etc. It should be noted that in addition to node 3 updating its cache with the response, it is preferable that nodes 1 and 2 also cache the response to the DNS query.

EXAMPLE 3

Figure 7:
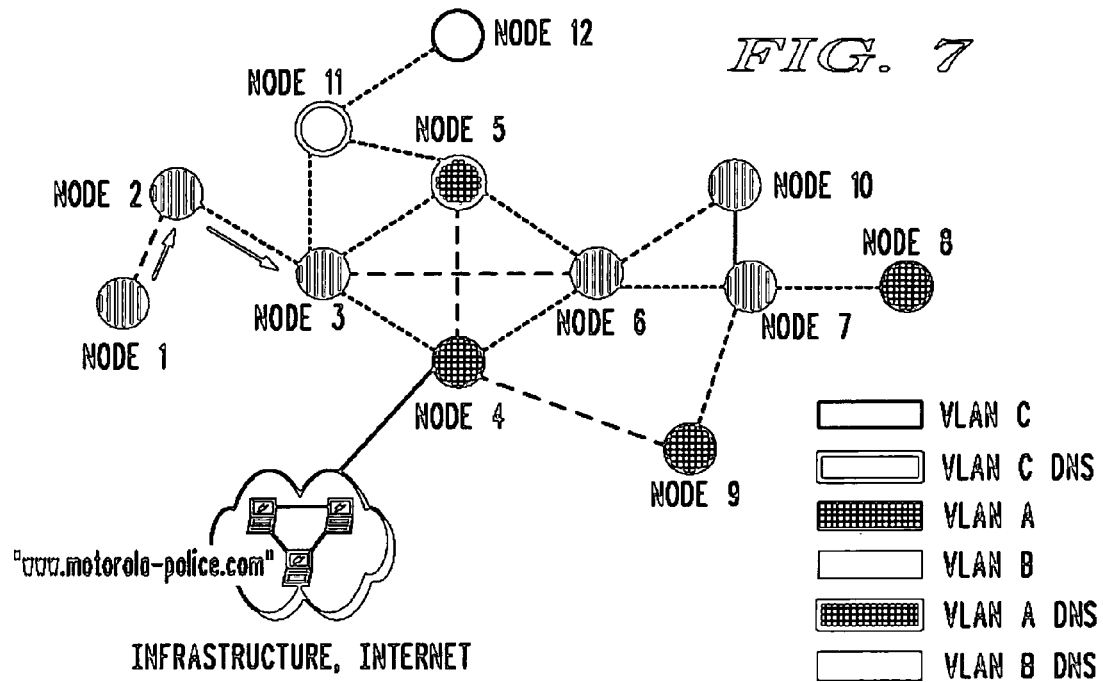
FIG. 7 illustrates a third example where the query is sent to the infrastructure for domain name resolution automatically by another primary DNS node in the ad hoc network in accordance with first embodiment of the present invention.
Figure 8:
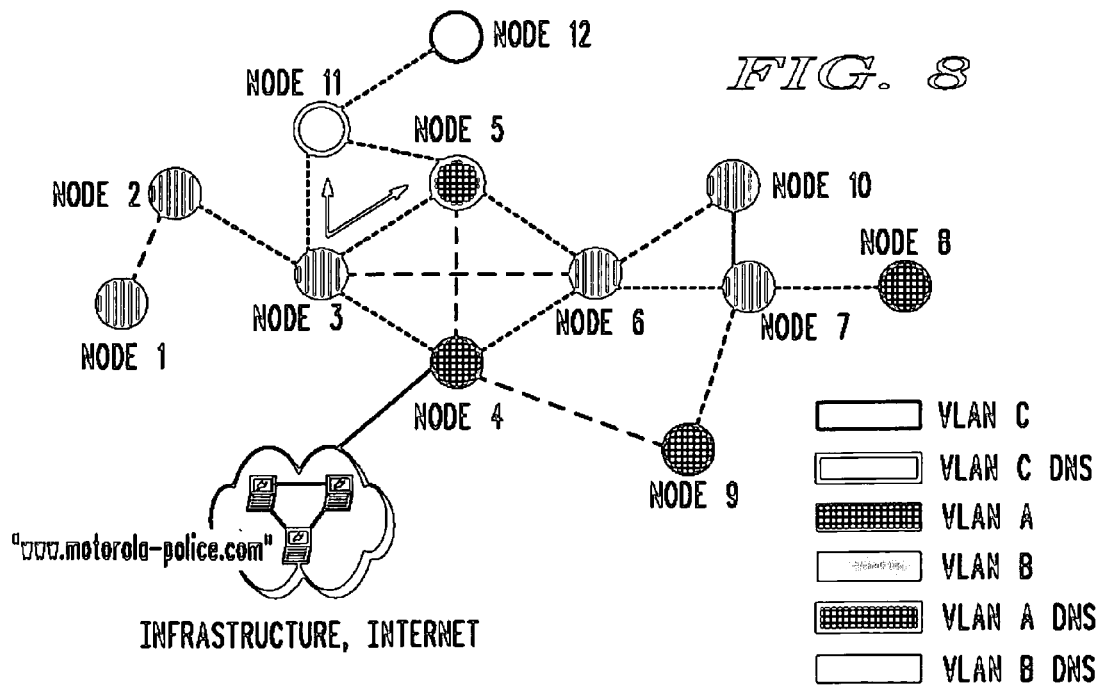
FIG. 8 further illustrates the third example of FIG. 7 in accordance with the present invention.

Moving on to the third example, FIGS. 7-12 illustrate a third example of the present invention where the DNS query is sent to the infrastructure for domain name resolution automatically by another primary DNS node in the ad hoc network. As illustrated in FIG. 7, node 1 (the requesting node belonging to VLAN B) initiates a DNS query directed towards node 3 (the primary DNS node witihn VLAN B) to provide the IP address for domain name "www.motorola-police.com". Upon receipt of the DNS query, node 3 determines whether it can resolve the query based on the information stored in its internal cache. In this example, since node 3 is unable to resolve the query, it forwards the query to the other primary DNS nodes in the ad hoc network: node 5 (the primary DNS node within VLAN A) and node 11 (the primary DNS node within VLAN C) as illustrated in FIG. 8.

Figure 11:
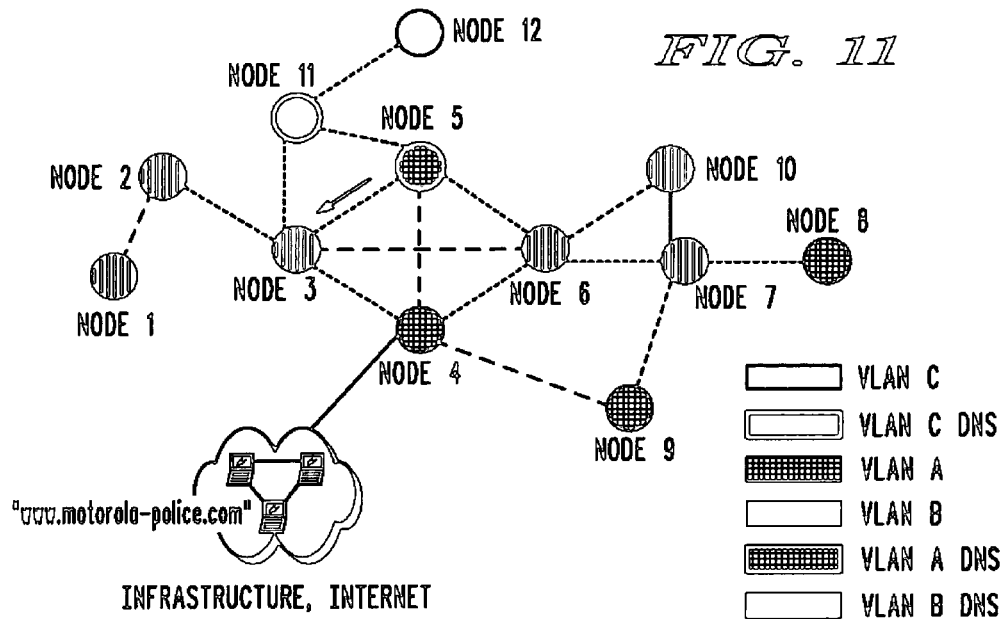
FIG. 11 further illustrates the third example of FIGS. 7-10 in accordance with the present invention.
Figure 12:
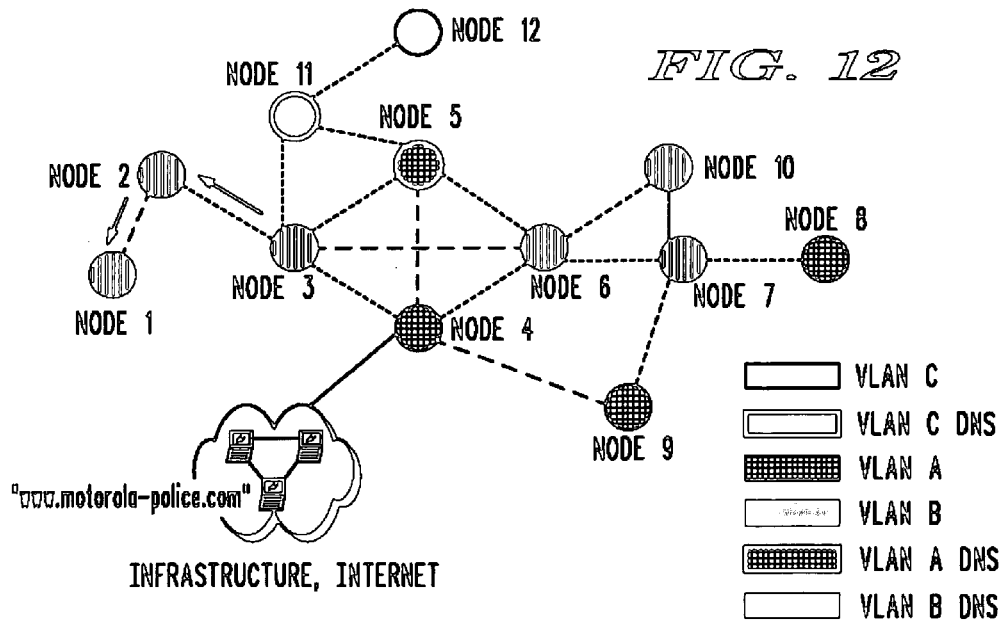
FIG. 12 further illustrates the third example of FIGS. 7-11 in accordance with the present invention.

In this third example, neither node 5 nor node 11 is able to resolve the DNS query for node 3. Since node 11 is unable to resolve the query, node 11 does nothing. Even though node 5 cannot resolve the query based on information stored in its cache, node 5 automatically forwards the DNS query outside the ad hoc network to the infrastructure for domain name resolution since a node that belongs to its VLAN (VLAN A) has connectivity to the infrastructure as illustrated in FIG. 9. Node 4 receives a response from the infrastructure (i.e., the domain name to IP address mapping), and forwards the response to node 5 as illustrated in FIG. 10. Upon receipt, node 5 updates its internal cache with the mapping and forwards the response to node 3 as illustrated in FIG. 11. Node 3 also updates its internal cache with the mapping and forwards the response to node 1 (the requesting node) as illustrated in FIG. 12. It should be noted that in addition to nodes 3 and 5 updating their cache with the response to the query received from the infrastructure, it is preferable that nodes 1, 2, and 4 also cache the response as well.

EXAMPLE 4

Figure 13:
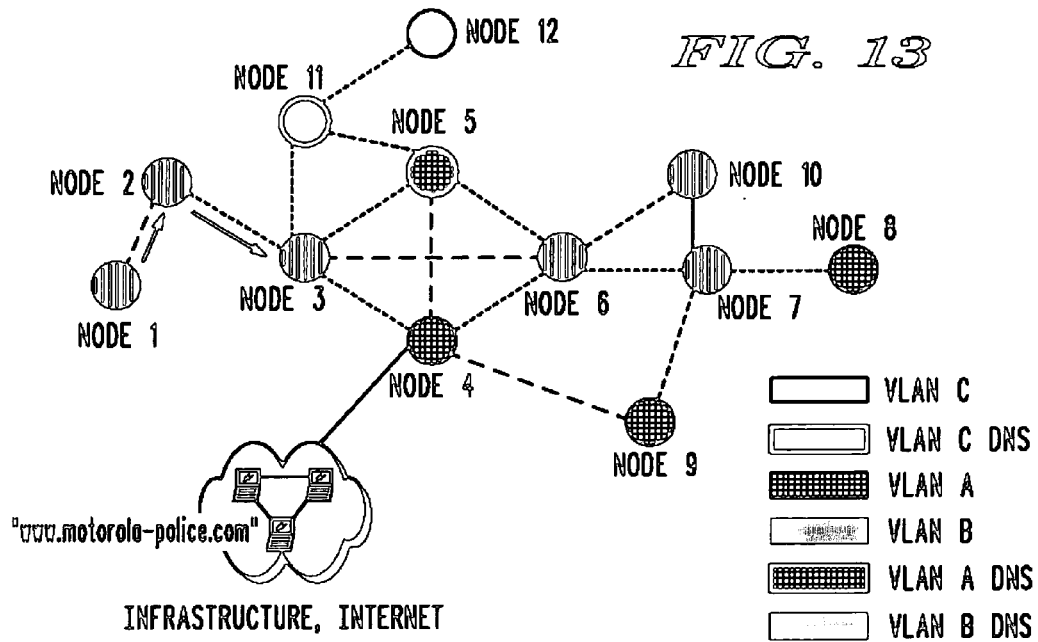
FIG. 13 illustrates a fourth example where the query is sent to the infrastructure for domain name resolution upon direction from the requesting primary DNS node in accordance with first embodiment of the present invention.
Figure 14:
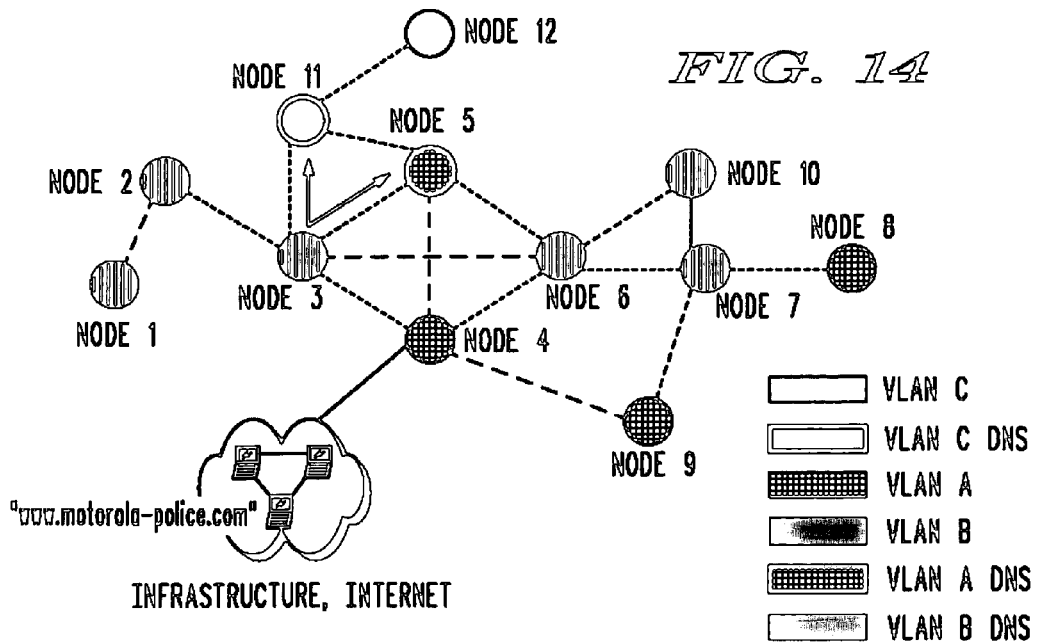
FIG. 14 further illustrates the fourth example of FIG. 13 in accordance with the present invention.

In yet a fourth example, as illustrated in FIGS. 13-19, the DNS query is sent to the infrastructure for domain name resolution upon direction from the requesting primary DNS node. As illustrated in FIG. 13, node 1 (the requesting node belonging to VLAN B) initiates a DNS query directed towards node 3 (the primary DNS node within VLAN B) to provide the IP address for the domain name "www.motorola-police.com". Upon receipt of the DNS query, node 3 determines whether it can resolve the query based on the information stored in its cache. In this example, as illustrated in FIG. 14, node 3 is unable to resolve the query and forwards the query to all the primary DNS nodes in the ad hoc network: node 5 (the primary DNS node within VLAN A) and node 10 (the primary DNS node within VLAN C).

Figure 15:
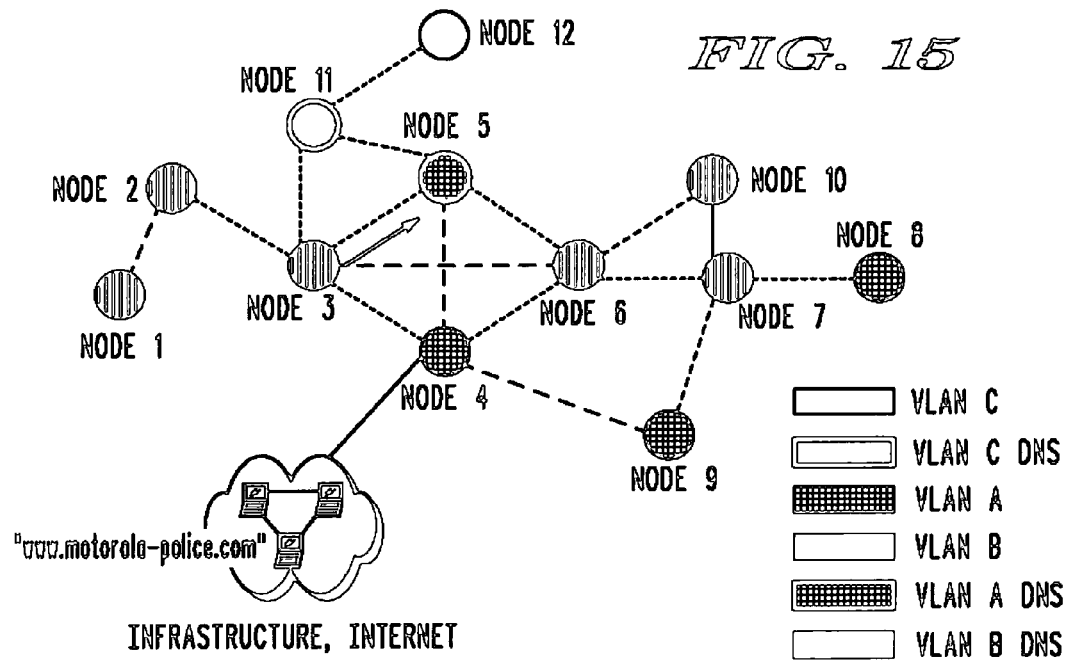
FIG. 15 further illustrates the fourth example of FIGS. 13-14 in accordance with the present invention.

After a configurable amount of time has lapsed, node 3 still has not received a response from the other primary DNS nodes in the ad hoc network indicating that the other primary DNS nodes also cannot resolve the DNS query base don information in their cache. As such, node 3 generates a directed DNS query to node 5 to send the query to the infrastructure for domain name resolution as illustrated in FIG. 15; in the preferred embodiment, all the primary DNS nodes know which VLANs have infrastructure connectivity based on periodic advertisements identifying which VLAN has at least one node with infrastructure connectivity.

Figure 16:
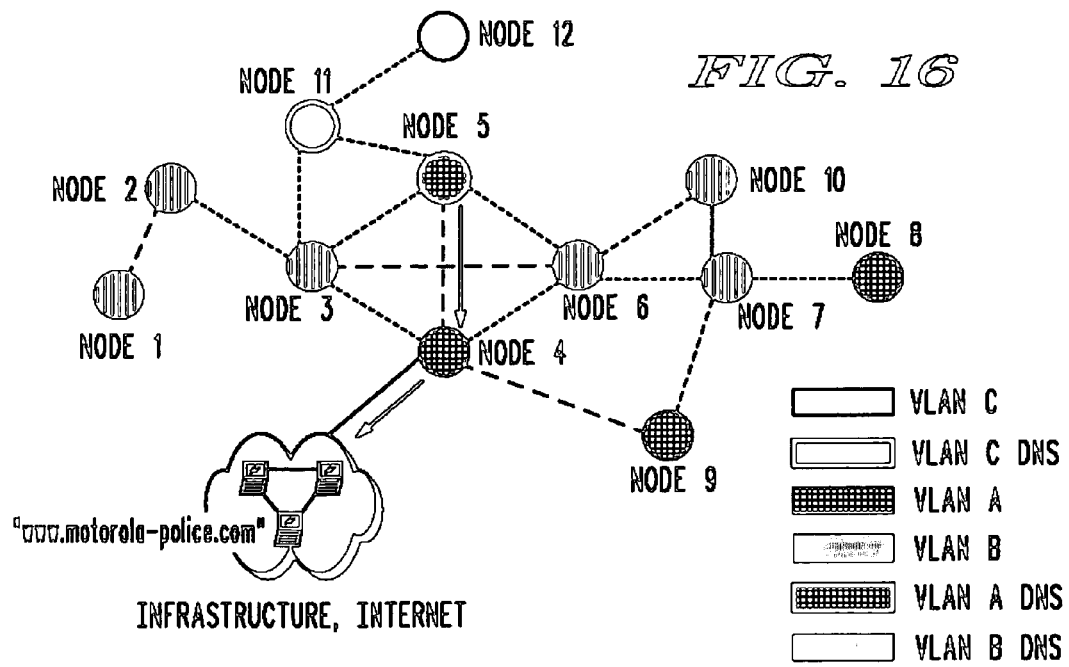
FIG. 16 further illustrates the fourth example of FIGS. 13-15 in accordance with the present invention.
Figure 17:
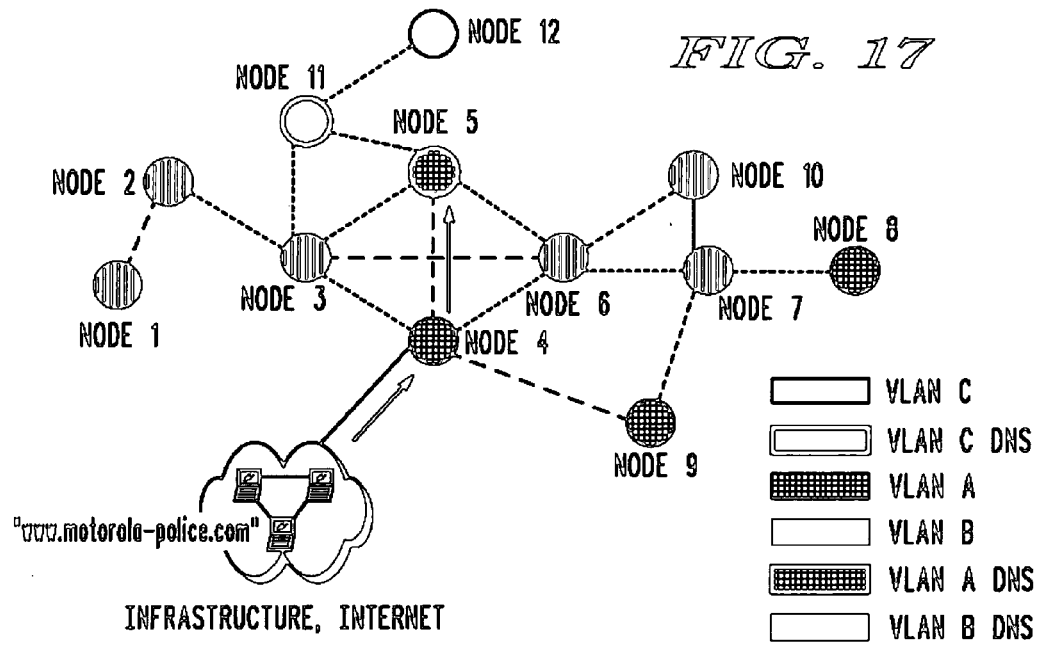
FIG. 17 further illustrates the fourth example of FIGS. 13-16 in accordance with the present invention.
Figure 18:
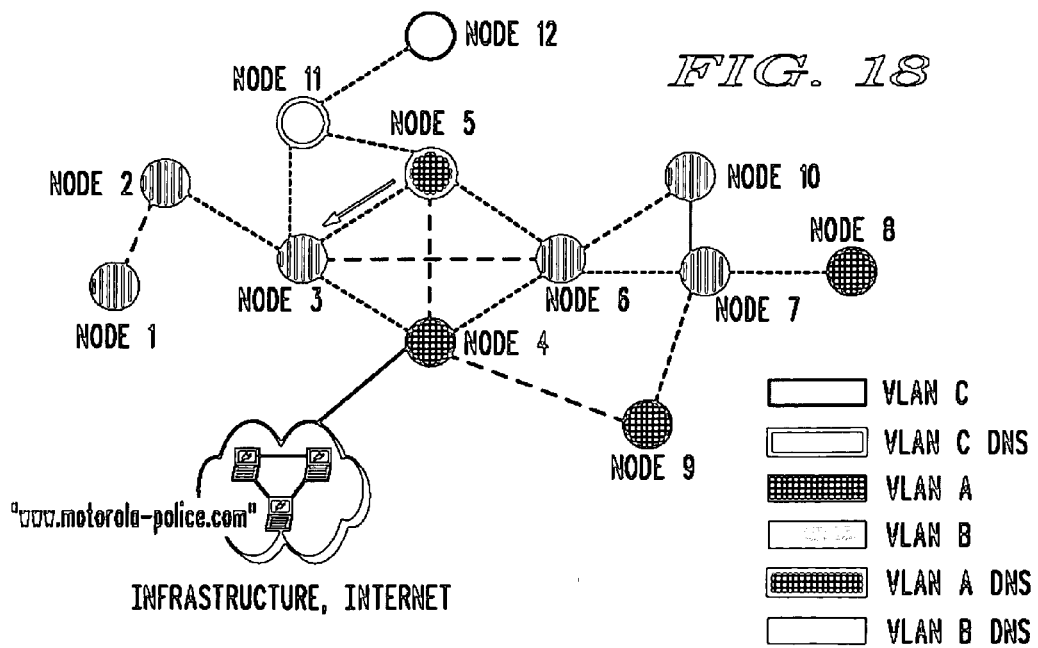
FIG. 18 further illustrates the fourth example of FIGS. 13-17 in accordance with the present invention.
Figure 19:
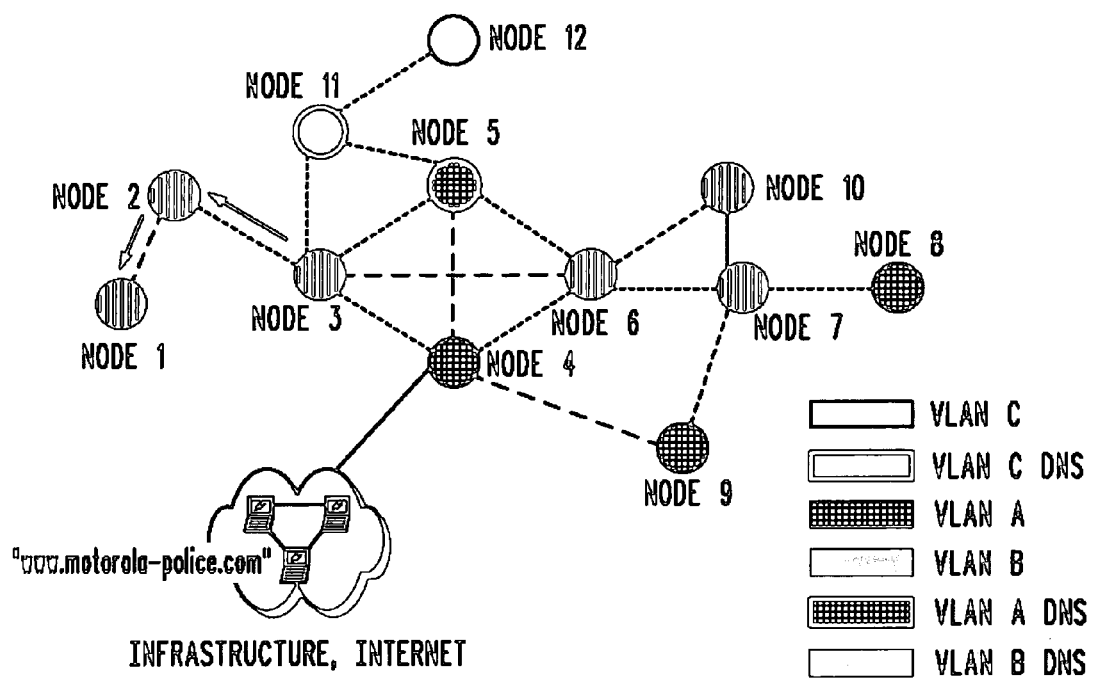
FIG. 19 further illustrates the fourth example of FIGS. 13-18 in accordance with the present invention.

Upon receipt of the directed DNS query, node 5 forwards the query to the infrastructure via node 4 as illustrated in FIG. 16. The infrastructure receives the query and responds by providing the domain name to IP address mapping to node 4, which in turns forwards the response to node 5 as illustrated in FIG. 17. Upon receipt of the response, node 5 caches the domain name to IP address mapping and forwards the response to node 3 as illustrated in FIG. 18. Node 3 also updates its cache with the domain name to IP address mapping and forward the response to node 1 (the requesting node) as illustrated in FIG. 19. Again, it should be noted that in addition to nodes 3 and 5 updating their cache with the response to the query received from the infrastructure, it is preferable that nodes 1, 2, and 4 also cache the response as well.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. In a wireless ad hoc network comprising a plurality of nodes, a method comprising the steps of:
dynamically electing a first primary node and a first secondary node from the plurality of nodes, wherein the first primary node comprises a domain name service (DNS) database, and the first secondary node mirrors the DNS database at the first primary node;
at the first primary node:
receiving a DNS query from a node;
determining whether the query can be resolved based on cached information; and
if the DNS query can be resolved based on cached information, sending a response to the node; otherwise, sending the DNS query outside the ad hoc network for resolution;
if the first primary node becomes unavailable, appointing the first secondary node as a second primary node and electing a second secondary node, wherein the second secondary node mirrors the DNS database at the second primary node.

2. The method of claim 1 further comprising the steps of, if the DNS query cannot be resolved based on cached information:
receiving a response to the DNS query from outside the ad hoc network;
caching the response at the first primary node; and
sending the response to the DNS query to the node.

3. In a wireless ad hoc network comprising a plurality of nodes, a method comprising the steps of:
dynamically electing a first primary node and a first secondary node from the plurality of nodes, wherein the first primary node comprises a domain name service (DNS) database, and the first secondary node mirrors the DNS database at the first primary node;
receiving a broadcast of a domain name service (DNS) database from the first primary node;
periodically receiving a broadcast of a delta change to the DNS database from the first primary node;
if unable to resolve a DNS query, sending the DNS query to the first primary node for resolution;
if the first primary node becomes unavailable, appointing the first secondary node as a second primary node and electing a second secondary node, wherein the second secondary node mirrors the DNS database at the second primary node.

4. The method of claim 3 wherein the primary node becomes unavailable if the primary node leaves the ad hoc network or if the primary node becomes non-responsive for a predetermined amount of time.

5. In a wireless ad hoc network comprising a plurality of nodes and a plurality of virtual local area networks (VLANs), wherein each VLAN has a primary node and a secondary node, a method comprising the steps of:
dynamically electing a first primary node and a first secondary node within each VLAN from the plurality of nodes, wherein the first primary node comprises a domain name service (DNS) database, and the first secondary node mirrors the DNS database at the first primary node;
if the first primary node within any VLAN becomes unavailable, appointing the first secondary node as a second primary node within the VLAN and electing a second secondary node within the VLAN, wherein the second secondary node mirrors the DNS database at the second primary node;
at the first primary node within a first VLAN:
receiving a DNS query from a node;
determining whether the DNS query can be resolved at the first primary node; and
if the DNS query can be resolved at the first primary node, sending a response to the DNS query to the node; otherwise, sending the DNS query to the first primary node within a second VLAN for resolution.

6. The method of claim 5 further comprising the steps of:
receiving a response to the DNS query from the first primary node in the second VLAN;
caching the response at the first primary node in the first VLAN; and
sending the response to the DNS query to the node.

7. The method of claim 6 wherein the first primary node in the second VLAN sent the DNS query outside the ad hoc network to obtain the response to the DNS query.

8. The method of claim 6 wherein the first primary node in the second VLAN resolved the DNS query at the first primary node in the second VLAN based on cached information.

9. The method of claim 5 further comprising the step of, if a response to the DNS query is not received from the first primary node in second VLAN after a predetermined amount of time has lapsed, sending the DNS query outside the ad hoc network for resolution.

10. The method of claim 9 wherein the step of sending the DNS query outside the ad hoc network for resolution comprises one of the following steps:
sending the DNS query outside the ad hoc network directly;
sending the DNS query outside the ad hoc network indirectly via at least one node belonging to the first VLAN; and
instructing the first primary node in the second VLAN to send the DNS query outside the ad hoc network.

11. The method of claim 5 further comprising the steps of:
periodically sending a first message to at least a portion of the primary nodes in the ad hoc network if a node in a first VLAN has connectivity outside the ad hoc network; and
periodically receiving a second message from at least a portion of the primary nodes in the ad hoc network if a node in another VLAN has connectivity outside the ad hoc network.

12. The method of claim 5 further comprising the steps of:
sending a first broadcast of a DNS database to a plurality of nodes within the first VLAN;
periodically sending a second broadcast of a delta change of the DNS database to the plurality of nodes in the first VLAN; and
if a node belonging to the first VLAN is unable to resolve a DNS query, sending the DNS query to the first primary node in the first VLAN for resolution.

13. In a wireless ad hoc network comprising a plurality of nodes, a method comprising the steps of:
dynamically electing a first primary node and a first secondary node from the plurality of nodes, wherein the first primary node comprises a domain name service (DNS) database, and the first secondary node mirrors the DNS database at the first primary node;
routing domain name service queries from the plurality of nodes to the first primary node for resolution; and
if the first primary node becomes unavailable, appointing the first secondary node as a second primary node, electing a second secondary node, and routing subsequent domain name service queries from the plurality of nodes to the second primary node for resolution, wherein the second secondary node mirrors the DNS database at the second primary node.

14. The method of claim 13 wherein the first primary node becomes unavailable if the first primary node leaves the ad hoc network or if the first primary node becomes non-responsive for a predetermined amount of time.

15. The method of claim 13 wherein the steps of electing is performed by the plurality of nodes implementing an election algorithm.

* * * * *